United States Patent
Nagai et al.

(10) Patent No.: US 12,221,775 B2
(45) Date of Patent: Feb. 11, 2025

(54) PERIPHERY MONITORING DEVICE FOR WORKING MACHINE

(71) Applicant: KOBELCO CONSTRUCTION MACHINERY CO., LTD., Hiroshima (JP)

(72) Inventors: Masaki Nagai, Hiroshima (JP); Yoichiro Yamazaki, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 253 days.

(21) Appl. No.: 17/770,904

(22) PCT Filed: Oct. 20, 2020

(86) PCT No.: PCT/JP2020/039447
§ 371 (c)(1),
(2) Date: Apr. 21, 2022

(87) PCT Pub. No.: WO2021/090678
PCT Pub. Date: May 14, 2021

(65) Prior Publication Data
US 2022/0372732 A1    Nov. 24, 2022

(30) Foreign Application Priority Data
Nov. 7, 2019    (JP) .................................. 2019-202421

(51) Int. Cl.
*E02F 9/26* (2006.01)
*B60R 1/23* (2022.01)
(Continued)

(52) U.S. Cl.
CPC ................ *E02F 9/261* (2013.01); *B60R 1/23* (2022.01); *B60R 1/27* (2022.01); *E02F 9/264* (2013.01);
(Continued)

(58) Field of Classification Search
CPC . E02F 9/261; E02F 9/264; E02F 3/435; E02F 9/24; E02F 9/26; B60R 1/23;
(Continued)

(56) References Cited

U.S. PATENT DOCUMENTS

| 11,365,527 B2 * | 6/2022 | Kiyota .................. G06V 40/20 |
| 2013/0033494 A1 * | 2/2013 | Kiyota .................. B66C 15/00 |
| | | 345/420 |

(Continued)

FOREIGN PATENT DOCUMENTS

| CN | 102947515 A | 2/2013 |
| JP | 2008-95307 A | 4/2008 |

(Continued)

OTHER PUBLICATIONS

Machine translation for application JP2010204821A, Konuma Chieko, Sep. 16, 2010.*

(Continued)

*Primary Examiner* — Abdalla A Khaled
(74) *Attorney, Agent, or Firm* — Oblon, McClelland, Maier & Neustadt, L.L.P.

(57) ABSTRACT

A periphery monitoring device calculates an expected passage range indicating a range of a locus of a machine body when a lower travelling body travels in an imaging direction of a camera, based on a slewing angle of an upper slewing body and an attitude of an attachment, and superimposes a range image indicating the calculated expected passage range on an image captured by the camera to display the superimposed image on the display.

9 Claims, 9 Drawing Sheets

(51) Int. Cl.
　　　*B60R 1/27*　　　(2022.01)
　　　*G06T 7/70*　　　(2017.01)
　　　*H04N 5/262*　　(2006.01)
　　　*H04N 5/272*　　(2006.01)
　　　*H04N 7/18*　　　(2006.01)

(52) U.S. Cl.
　　　CPC .............. *G06T 7/70* (2017.01); *H04N 5/2624* (2013.01); *H04N 5/272* (2013.01); *H04N 7/18* (2013.01); *B60R 2300/105* (2013.01); *B60R 2300/302* (2013.01); *B60R 2300/303* (2013.01); *B60R 2300/8093* (2013.01); *G06T 2207/30261* (2013.01)

(58) Field of Classification Search
　　　CPC ............... B60R 1/27; B60R 2300/105; B60R 2300/302; B60R 2300/303; B60R 2300/8093; B60R 2300/605; B60R 2300/607; B60R 1/00; B60R 2300/802; G06T 7/70; G06T 2207/30261; H04N 5/2624; H04N 5/272; H04N 7/18; H04N 7/183; H04N 23/695
　　　See application file for complete search history.

(56) References Cited

U.S. PATENT DOCUMENTS

| | | | | |
|---|---|---|---|---|
| 2013/0088593 | A1* | 4/2013 | Ishimoto | E02F 9/226 348/143 |
| 2013/0222573 | A1* | 8/2013 | Onuma | E02F 9/24 348/82 |
| 2015/0009329 | A1* | 1/2015 | Ishimoto | E02F 9/264 348/148 |
| 2016/0205319 | A1* | 7/2016 | Oota | E02F 9/261 348/38 |
| 2017/0146343 | A1* | 5/2017 | Matsuo | H04N 13/239 |
| 2018/0126905 | A1* | 5/2018 | Tabata | H04N 23/635 |
| 2022/0042282 | A1* | 2/2022 | Nakayama | F16P 3/16 |
| 2022/0154425 | A1* | 5/2022 | Yamamoto | E02F 3/325 |
| 2022/0213669 | A1* | 7/2022 | Eguchi | E02F 9/26 |
| 2022/0298756 | A1* | 9/2022 | Eguchi | G06V 20/58 |
| 2022/0327901 | A1* | 10/2022 | Imaizumi | G01S 15/87 |

FOREIGN PATENT DOCUMENTS

| | | | |
|---|---|---|---|
| JP | 2008-179940 A | | 8/2008 |
| JP | 2008-240362 A | | 10/2008 |
| JP | 2010204821 A | * | 3/2009 |
| JP | 2011-12522 A | | 1/2011 |
| JP | 2013-142228 A | | 7/2013 |

OTHER PUBLICATIONS

Combined Chinese Office Action and Search Report issued Mar. 3, 2023, in corresponding Chinese Patent Application No. 202080074158.7 (with Partial English Translation and English Translation of Category of Cited Documents), 13 pages.

Extended European Search Report issued on Oct. 28, 2022 in European Patent Application No. 20886038.7, 8 pages.

International Search Report issued Dec. 28, 2020 in PCT/JP2020/039447filed on Oct. 20, 2020, 2 pages.

* cited by examiner

PERIPHERY MONITORING DEVICE FOR WORKING MACHINE

TECHNICAL FIELD

The present invention relates to a periphery monitoring device for a working machine, the periphery monitoring device monitoring a periphery of the working machine.

BACKGROUND ART

Patent Literature 1 discloses a monitor device that displays an image captured by a monitoring camera on a monitor and synthesizes to display an arc-shaped boundary line clearly indicating a slewing operation region of an upper slewing body on a monitor screen.

However, the monitoring device of Patent Literature 1 can determine the contact between the upper slewing body and an obstacle when the upper slewing body slews, but cannot determine the contact between the upper slewing body and the obstacle when a lower travelling body travels.

For example, when the lower travelling body travels, obstacles in front of and above the upper slewing body and an attachment can come into contact with each other depending on the attitude of the attachment. In addition, when the lower travelling body travels in a state where the upper slewing body slews, the side surface of a counterweight, which is a rear end portion of the upper slewing body, becomes a blind spot from a cab, and the counterweight and an obstacle can come into contact with each other.

CITATION LIST

Patent Literature

Patent Literature 1: JP 2011-12522 A

SUMMARY OF INVENTION

An object of the present invention is to provide a periphery monitoring device for a working machine, the periphery monitoring device being capable of making it easy for an operator to judge contact between an upper slewing body and an obstacle when a lower travelling body travels.

The present invention is a periphery monitoring device for a working machine, the periphery monitoring device configured to monitor a periphery of the working machine having a machine body including a lower travelling body and an upper slewing body disposed in a slewable manner on an upper portion of the lower travelling body, the upper slewing body including a working device rotatable in a vertical direction with respect to a main body of the upper slewing body, and a cab. The periphery monitoring device includes a slewing angle detection device configured to detect a slewing angle of the upper slewing body with respect to the lower travelling body, an attitude detection device configured to detect an attitude of the working device, an imaging device configured to image a periphery of the upper slewing body, the imaging device being disposed at the upper slewing body, a display device disposed in the cab, a display control unit configured to cause the display device to display an image captured by the imaging device, and an expected passage range calculation unit configured to calculate a range of a locus of the machine body as an expected passage range in a case where the lower travelling body travels in an imaging direction of the imaging device, based on the slewing angle of the upper slewing body detected by the slewing angle detection device and the attitude of the working device detected by the attitude detection device. The display control unit superimposes a range image indicating the expected passage range calculated by the expected passage range calculation unit on an image captured by the imaging device to cause the display device to display a superimposed image.

According to the present invention, the range image indicating the expected passage range that is the range of the locus of the machine body in the case where the lower travelling body travels in the imaging direction of the imaging device is superimposed on the image captured by the imaging device to be displayed on the display device. This enables the operator who views the display device to judge whether an obstacle is present within the expected passage range when the image captured by the imaging device includes the obstacle. Therefore, the operator can easily judge the contact between the upper slewing body and the obstacle when the lower travelling body travels.

DESCRIPTION OF EMBODIMENTS

Preferred embodiments of the present invention will be described below with reference to the accompanying drawings. Note that the following embodiments are examples embodying the present invention, and are not intended to limit the technical scope of the present invention.

The preferred embodiments of the present invention will be described below with reference to the drawings.

First Embodiment (Configuration of Working Machine)

A periphery monitoring device for a working machine (periphery monitoring device) according to the first embodiment of the present invention is configured to monitor a periphery of the working machine.

Figure 1:
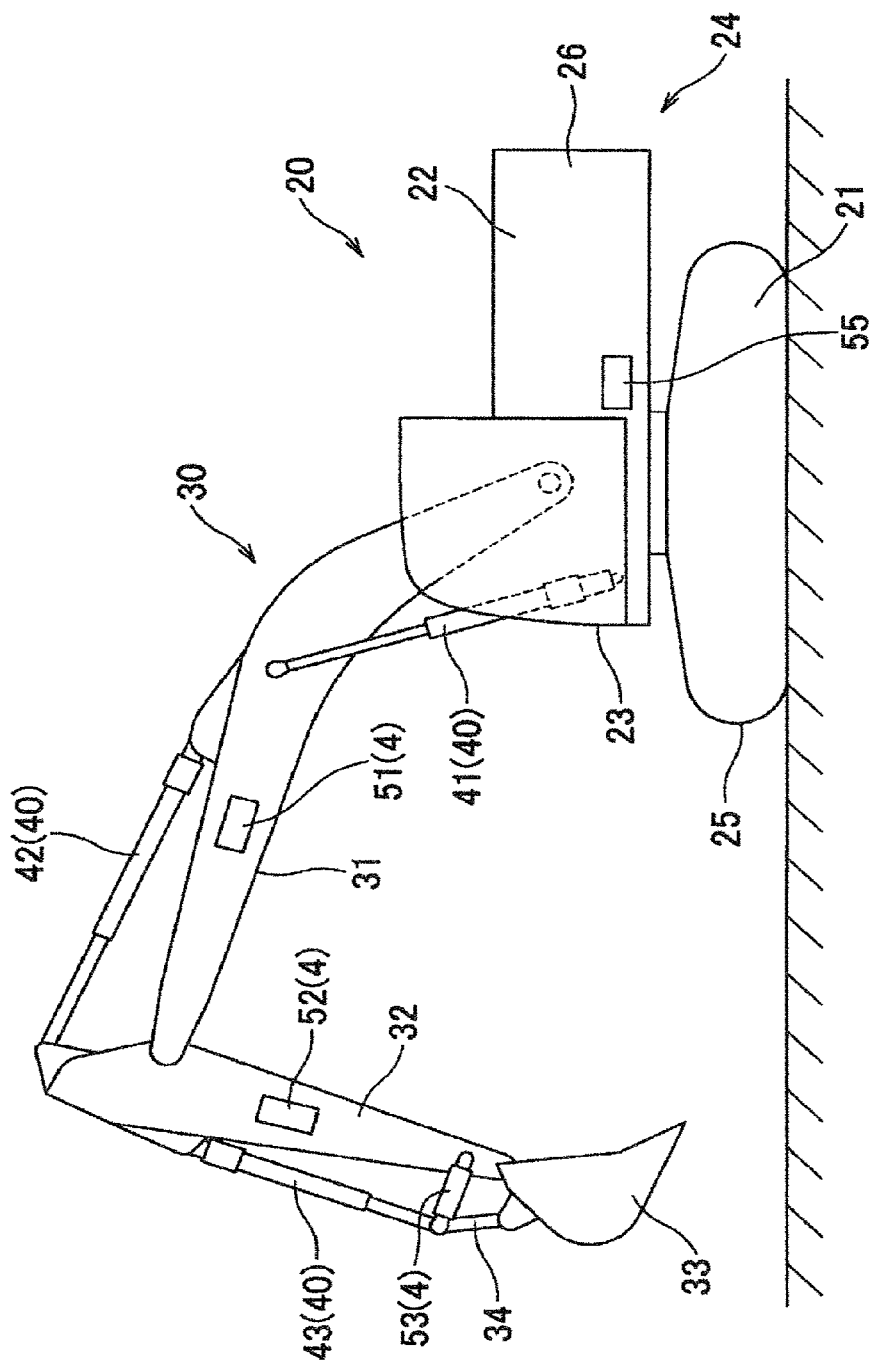
FIG. 1 is a side view of a working machine.

FIG. 1 is a side view of a working machine 20. As illustrated in FIG. 1, the working machine 20 is a machine, such as a hydraulic excavator, that performs work using an attachment 30. The working machine 20 includes a machine body 24 having a lower travelling body 21 and an upper slewing body 22, the attachment (working device) 30, and a cylinder 40.

The lower travelling body 21 is a device that causes the working machine 20 to travel, and includes a pair of crawlers 25. The upper slewing body 22 is attached to an upper portion of the lower travelling body 21 in a slewable manner via a slewing device. A cab (operator's cab) 23 is provided in a front portion of the upper slewing body 22. The cab 23 is disposed on a left side with respect to the center of the upper slewing body 22 in a side-to-side direction of the upper slewing body 22. A counterweight 26 is disposed at a rear end of the upper slewing body 22. The rear end of the upper slewing body 22 is the rear end of the counterweight 26.

The attachment 30 is attached to the upper slewing body 22 rotatably and vertically with respect to the main body of the upper slewing body 22. The attachment 30 includes a boom 31, an arm 32, and a bucket 33. The boom 31 is rotatably (raisably) attached to the upper slewing body 22. The arm 32 is rotatably attached to the boom 31. The bucket 33 is rotatably attached to the arm 32. The bucket 33 is equipment that performs work such as excavation, leveling, and scooping of a work target (earth and sand).

The cylinder 40 can rotate the attachment 30. The cylinder 40 is a hydraulic telescopic cylinder. The cylinder 40 includes a boom cylinder 41, an arm cylinder 42, and a bucket cylinder 43.

The boom cylinder 41 rotationally drives the boom 31 with respect to the upper slewing body 22. A proximal end of the boom cylinder 41 is rotatably attached to the upper slewing body 22. A distal end of the boom cylinder 41 is rotatably attached to the boom 31.

The arm cylinder 42 rotationally drives the arm 32 with respect to the boom 31. A proximal end of the arm cylinder 42 is rotatably attached to the boom 31. A distal end of the arm cylinder 42 is rotatably attached to the arm 32.

The bucket cylinder 43 rotationally drives the bucket 33 with respect to the arm 32. A proximal end of the bucket cylinder 43 is rotatably attached to the arm 32. A distal end of the bucket cylinder 43 is rotatably attached to a link member rotatably attached to the bucket 33.

[Configuration of Periphery Monitoring Device]

Figure 2:
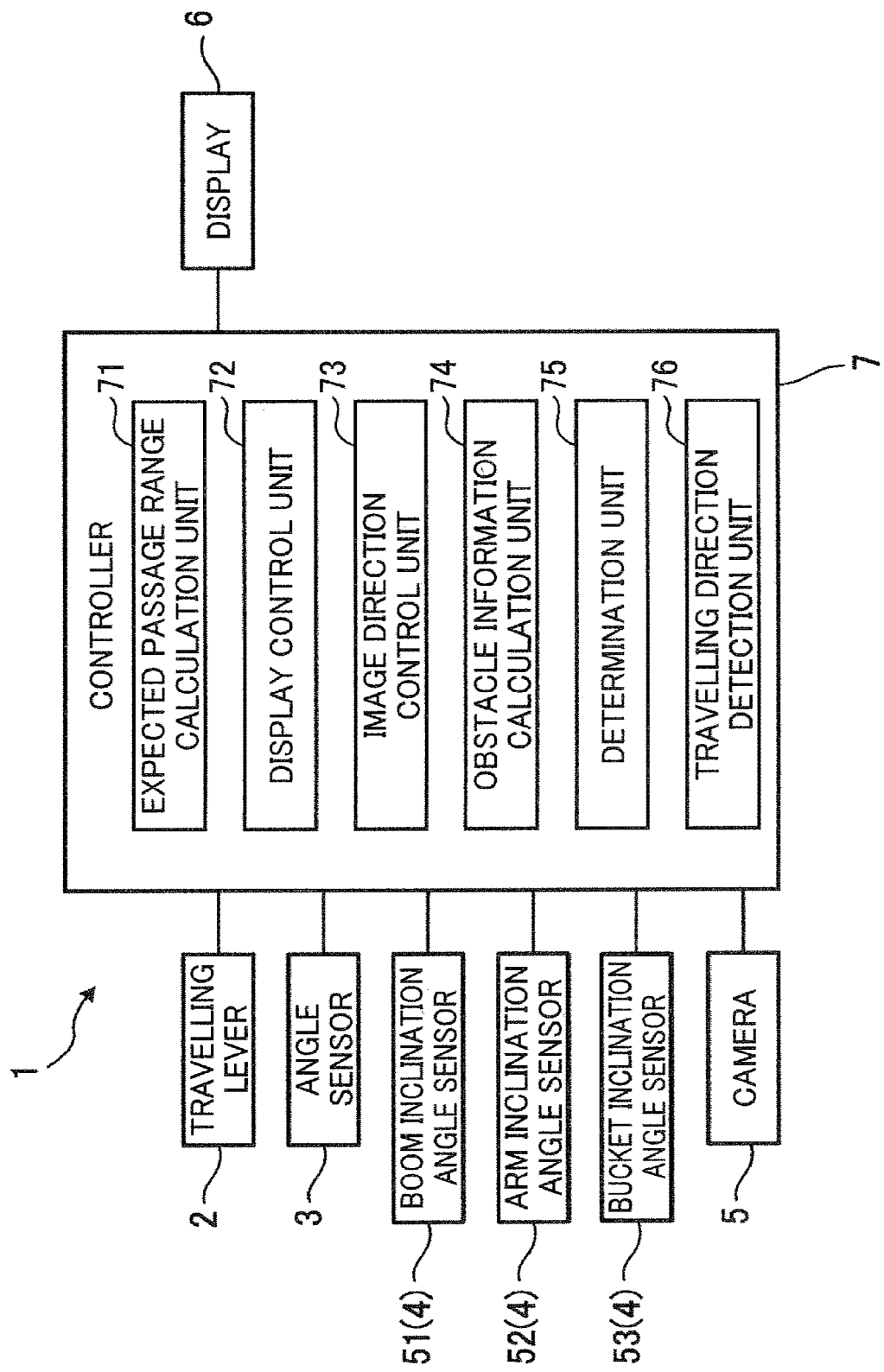
FIG. 2 is a circuit diagram of a periphery monitoring device.

FIG. 2 is a circuit diagram of a periphery monitoring device 1. As illustrated in FIG. 2, the periphery monitoring device 1 includes a travelling lever 2, an angle sensor 3, an inclination angle sensor 4, a camera 5, a display 6, and a controller 7. The controller 7 is configured by a computer including a central processing unit (CPU), a memory, and the like. The controller 7 includes an expected passage range calculation unit 71, a display control unit 72, an image direction control unit 73, an obstacle information calculation unit 74, a determination unit 75, and a travelling direction detection unit 76. These blocks may be achieved, for example, by a computer executing a predetermined program, or may be configured by a dedicated electric circuit.

The travelling lever 2 is disposed in the cab 23. The travelling lever 2 includes a left travelling lever 2 and a right travelling lever 2. The left travelling lever 2 and the right travelling lever 2 are disposed side by side in front of a seat on which an operator who operates the working machine 20 is seated. The right travelling lever 2 is associated with the right crawler 25, and the left travelling lever 2 is associated with the left crawler 25. The travelling lever 2 is operated by an operator. In the present embodiment, when the lower travelling body 21 is moved forward, each of the left and right travelling levers 2 is inclined forward, and when the lower travelling body 21 is moved backward, each of the left and right travelling levers 2 is inclined backward. When the inclination amount of one travelling lever 2 of the left and right travelling levers 2 is larger than that of the other travelling lever 2, the lower travelling body 21 travels in a curve. Note that the travelling lever 2 may also serve as a travelling pedal.

The travelling direction detection unit 76 detects a travelling direction of the lower travelling body 21 based on the inclination amount of the travelling lever 2. Specifically, the right travelling lever 2 includes a right travelling operation amount sensor. The right travelling operation amount sensor detects an operation amount (inclination amount) including an operation direction of the right travelling lever 2. Similarly, the left travelling lever 2 includes a left travelling operation amount sensor. The left travelling operation amount sensor detects an operation amount (inclination amount) including an operation direction of the left travelling lever 2. The right travelling operation amount sensor and the left travelling operation amount sensor are configured by an angle sensor or a pressure sensor, and output a signal corresponding to the operation amount to the controller 7. The travelling direction detection unit 76 detects the travelling direction of the lower travelling body 21 based on the operation amount of the left travelling lever 2 detected by the left travelling operation amount sensor and the operation amount of the right travelling lever 2 detected by the right travelling operation amount sensor. The travelling direction detection unit 76, the left travelling operation amount sensor, and the right travelling operation amount sensor are examples of the travelling direction detection device.

The angle sensor (slewing angle detection device) 3 detects a slewing angle of the upper slewing body 22 with respect to the lower travelling body 21. The angle sensor 3 is, for example, an encoder, a resolver, or a gyro sensor. In the present embodiment, the slewing angle of the upper slewing body 22 is 0° when the front of the upper slewing body 22 coincides with the front of the lower travelling body 21.

The inclination angle sensor (attitude detection device) 4 detects an attitude of the attachment 30. As illustrated in FIG. 1, the inclination angle sensor 4 includes a boom inclination angle sensor 51, an arm inclination angle sensor 52, and a bucket inclination angle sensor 53.

The boom inclination angle sensor 51 is attached to the boom 31 and detects an attitude of the boom 31. The boom inclination angle sensor 51 is, for example, an inclination (acceleration) sensor that acquires an inclination angle of the boom 31 with respect to a horizontal line. Note that the boom inclination angle sensor 51 may be a rotation angle sensor that detects a rotation angle of a boom foot pin (boom proximal end) or a stroke sensor that detects a stroke amount of the boom cylinder 41.

The arm inclination angle sensor 52 is attached to the arm 32 and detects an attitude of the arm 32. The arm inclination angle sensor 52 is, for example, an inclination (acceleration) sensor that acquires an inclination angle of the arm 32 with respect to the horizontal line. Note that the arm inclination angle sensor 52 may be a rotation angle sensor that detects a rotation angle of an arm connecting pin (arm proximal end) or a stroke sensor that detects a stroke amount of the arm cylinder 42.

The bucket inclination angle sensor 53 is attached to the link member 34 and detects an attitude of the bucket 33. The bucket inclination angle sensor 53 is, for example, an inclination (acceleration) sensor that acquires an inclination angle of the bucket 33 with respect to the horizontal line. Note that the bucket inclination angle sensor 53 may be a rotation angle sensor that detects a rotation angle of a bucket connecting pin (bucket proximal end) or a stroke sensor that detects a stroke amount of the bucket cylinder 43.

Figure 3:
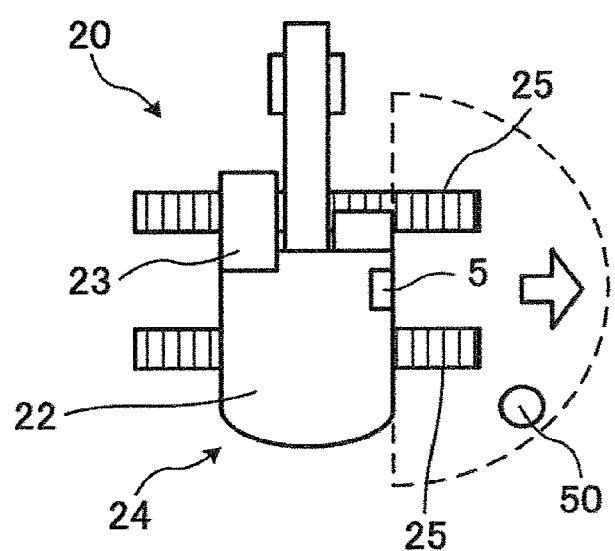
FIG. 3 is a top view of a working machine traveling straight in a first embodiment.

FIG. 3 is a top view of the working machine 20. As illustrated in FIG. 3, the camera (imaging device) 5 is disposed on the upper slewing body 22. The camera 5 images the periphery of the upper slewing body 22. The camera 5 is rotatable on a horizontal plane about a vertical axis at an attachment position thereof. Note that the camera 5 may be configured to be capable of being directed in any direction by rotating the camera 5. Furthermore, the camera 5 may include a drive unit that rotates itself. The drive unit includes, for example, an electric motor that can be controlled by the controller 7. FIG. 3 illustrates a state that the slewing angle of the upper slewing body 22 with respect to the lower travelling body 21 is 90°. The camera 5 can image the obstacle 50 on the right side of the upper slewing body 22.

Figure 4A:
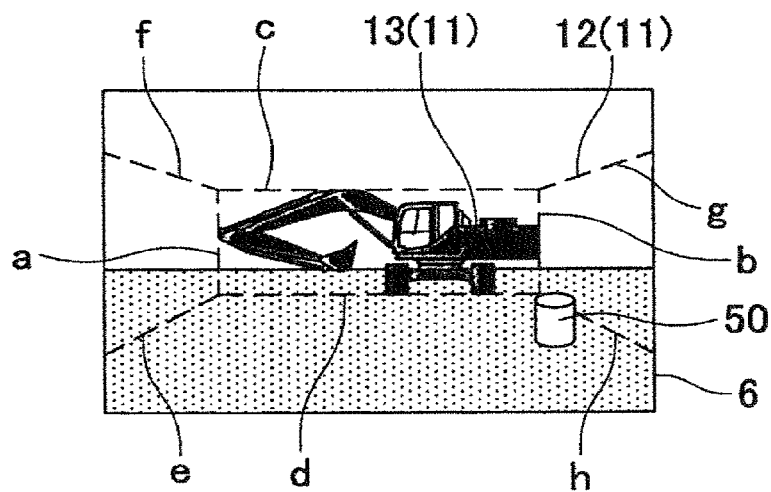
FIG. 4A is a diagram illustrating a display screen in the working machine traveling straight in the first embodiment, and is a diagram in a case where an attitude of the attachment is low.
Figure 4B:
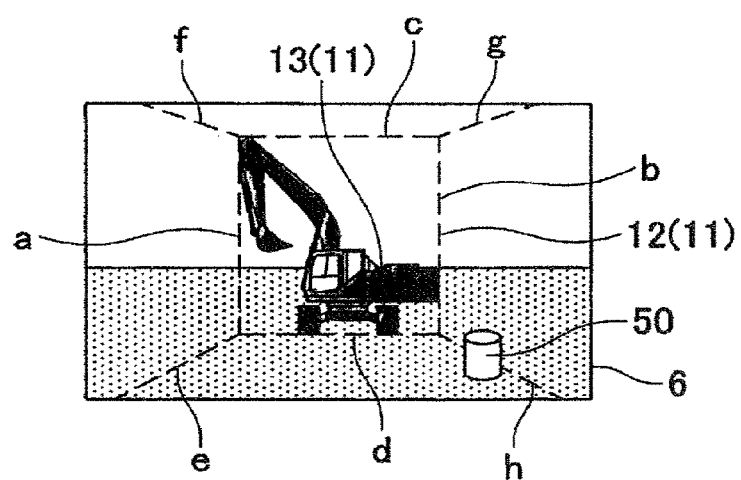
FIG. 4B is a diagram illustrating a display screen in the working machine traveling straight in the first embodiment, and is a diagram in a case where the attitude of the attachment is high.

The display (display device) 6 is disposed in the cab 23. FIGS. 4A and 4B are diagrams illustrating screens displayed by the display 6. As illustrated in FIGS. 4A and 4B, the display control unit 72 causes the display 6 to display an image captured by the camera 5. In the examples of FIGS. 4A and 4B, the image displayed on the display 6 includes the obstacle 50.

As illustrated in FIG. 3, the camera 5 captures an image of a region that is a blind spot as viewed from the cab 23. Specifically, the camera 5 is disposed on the right side with respect to the center of the upper slewing body 22 in the side-to-side direction of the upper slewing body 22, and images the right side of the upper slewing body 22. As described above, the cab 23 is disposed on the left side with respect to the center of the upper slewing body 22 in the side-to-side direction of the upper slewing body 22. Therefore, the operator in the cab 23 can visually recognize the left side of the upper slewing body 22. Therefore, when the lower travelling body 21 travels leftward in the figure in the state illustrated in FIG. 3, even if an obstacle is present on the left side of the upper slewing body 22, the operator in the cab 23 can visually check whether the rear end portion of the upper slewing body 22 comes into contact with the obstacle. On the other hand, the right side of the upper slewing body 22 is a blind spot for the operator in the cab 23. Therefore, when the lower travelling body 21 travels rightward (a direction of an arrow) in the figure in the state illustrated in FIG. 3, even if an obstacle is present on the right side of the upper slewing body 22, the operator in the cab 23 cannot visually check whether the rear end portion of the upper slewing body 22 comes into contact with the obstacle.

The expected passage range calculation unit 71 calculates a range of a locus of the machine body 24 as the expected passage range when the lower travelling body 21 travels in the imaging direction (the direction of the arrow) of the camera 5, based on the slewing angle of the upper slewing body 22 detected by the angle sensor 3 and the attitude of the attachment 30 detected by the inclination angle sensor 4.

For example, the expected passage range calculation unit 71 sets the expected passage range in a three-dimensional coordinate system of the working machine 20 based on the slewing angle of the upper slewing body 22 and the attitude of the attachment 30. Specifically, the expected passage range calculation unit 71 sets, in the coordinate system, a plane that is perpendicular to the imaging direction (optical axis) of the camera 5 and passes through the center of the working machine 20. Next, the expected passage range calculation unit 71 projects a shape of the working machine 20 specified from the slewing angle of the upper slewing body 22 and the attitude of the attachment 30 onto the plane. The expected passage range calculation unit 71 then sets a circumscribed rectangle in the working machine 20 projected onto the plane, and sets a rectangular parallelepiped region obtained by extending the circumscribed rectangle by a predetermined distance toward the imaging direction of the camera in the coordinate system. This rectangular parallelepiped region is the expected passage range.

As illustrated in FIGS. 4A and 4B, the display control unit 72 superimposes the range image 11 indicating the expected passage range calculated by the expected passage range calculation unit 71 on the image captured by the camera 5 to display the resultant image on the display 6. As illustrated in FIGS. 4A and 4B, the range image 11 includes a line image 12 including lines a and b indicating the width of the locus of the machine body 24, lines c and d indicating the height of the locus of the machine body 24, and lines e, f, g, and h indicating the depth of the locus of the machine body 24. The range image 11 further includes a contour image 13 indicating the contour of the machine body 24.

In FIG. 4A, the expected passage range corresponds to, for example, a range in a quadrangle surrounded by the lines a, b, c, and d, a range above the lines f, c, and g, and a range below the lines e, d, and h. A rectangle surrounded by the lines a to d is a circumscribed rectangle of the working machine 20.

The expected passage range calculation unit 71 further calculates the contour of the working machine 20 using the slewing angle of the upper slewing body 22 and the attitude of the attachment 30 in a case where the working machine 20 is viewed from the imaging direction of the camera 5.

The display control unit 72 superimposes the contour image 13 indicating the contour of the working machine 20 calculated by the expected passage range calculation unit 71 on the image captured by the camera 5 to display the resultant image.

Here, the line image 12 illustrated in FIG. 4A is a line image 12 in a case where the attitude of the attachment 30 is low. On the other hand, the line image 12 illustrated in FIG. 4B is the line image 12 in a case where the attitude of the attachment 30 is high. In FIG. 4B, the attitude of the attachment 30 is higher than that in the case of FIG. 4A. Accordingly, in FIG. 4B, the lengths of the lines a and b are longer than those in FIG. 4A. Further, in FIG. 4B, a slewing radius of the working machine 20 becomes shorter as the attitude of the attachment 30 becomes higher. Accordingly, in FIG. 4B, the lengths of the lines c and d are shorter than those in FIG. 4A.

As described above, the range image 11 is superimposed on the image captured by the camera 5 and the resultant image is displayed on the display 6. As a result, when the image captured by the camera 5 includes the obstacle 50, the operator who views the display 6 can check whether the obstacle 50 is within the expected passage range. Therefore, the operator can easily check the contact between the upper slewing body 22 and the obstacle 50 when the lower travelling body 21 travels.

Further, since the expected passage range is displayed on the display 6 as the line image 12, the area of the range image 11 to be superimposed on the image captured by the camera 5 can be minimized. Therefore, the operator can easily judge whether the image captured by the camera 5 includes the obstacle 50.

Further, since the expected passage range is displayed on the display 6 as the contour image 13, and thus the operator can easily check, based on a positional relationship between the contour image 13 and the obstacle 50, the contact between the upper slewing body 22 and the obstacle 50 when the lower travelling body 21 travels. Further, the operator can objectively check the attitude of the machine body 24 based on the contour of the machine body 24 indicated by the contour image 13.

In addition, the display control unit 72 superimposes the range image 11 on a position in the image corresponding to a position separated from the machine body 24 by a predetermined distance in the imaging direction of the camera 5 to display the resultant image. Therefore, since the image captured by the camera 5 has an illusion of depth, the operator can easily check the contact between the upper slewing body 22 and the obstacle 50 when the lower travelling body 21 travels. A distance larger than a protruding amount by which the crawlers 25 protrude in the traveling direction of the lower travelling body 21 with respect to the upper slewing body 22 is set as the predetermined distance. The predetermined distance may be changeable by an operator.

The display control unit 72 may display the range image 11 on the display 6 on condition that the lower travelling body 21 travels and the traveling direction of the lower travelling body 21 detected by the travelling direction detection unit 76 is the imaging direction of the camera 5. As a result, when the lower travelling body 21 does not travel or when the traveling direction of the lower travelling body 21 is not the imaging direction of the camera 5, the range image 11 is not superimposed and displayed on the display 6. In these cases, since the image captured by the camera 5 is not blocked by the range image 11, the image captured by the camera 5 can be easily viewed.

Further, when the lower travelling body 21 travels, the image direction control unit 73 causes the display 6 to display the image captured by the camera 5 so that the image captured by the camera 5 becomes an image on which the traveling direction of the lower travelling body 21 detected by the travelling direction detection unit 76 is a line of sight. Specifically, the image direction control unit 73 rotates the camera 5 so that the camera 5 faces the traveling direction of the lower travelling body 21. Thus, the image displayed on the display 6 becomes an image on which the traveling direction of the lower travelling body 21 is a line of sight. As a result, the image displayed on the display 6 becomes an image on which the traveling direction of the lower travelling body 21 is a line of sight even if the upper slewing body 22 slews in any way. Therefore, the operator who views the display 6 can intuitively judge whether the obstacle 50 is present in the traveling direction of the lower travelling body 21.

Note that the image direction control unit 73 may correct the image captured by the camera 5 without rotating the camera 5, so that the image displayed on the display 6 may be an image on which the traveling direction of the lower travelling body 21 is the line of sight. For example, the image direction control unit 73 may set a virtual screen in a direction perpendicular to the traveling direction of the lower travelling body 21 and project the image captured by the camera 5 onto the virtual screen to correct the image captured by the camera 5.

Note that FIG. 3 illustrates a case where the lower travelling body 21 travels straight to the right in the drawing. Here, the determination is made whether the lower travelling body 21 travels, based on, for example, signals from the right travelling operation amount sensor and the left travelling operation amount sensor. When the operation amount of the travelling lever 2 is greater than or equal to a threshold, the determination is made that the lower travelling body 21 travels. The operation amount of the travelling lever 2 has so-called play, and the crawlers 25 do not travel even if the travelling lever 2 is inclined within the range of play. The threshold of the operation amount is an operation amount at the boundary between the cases where the crawlers 25 do not travel and travels.

Figure 5:
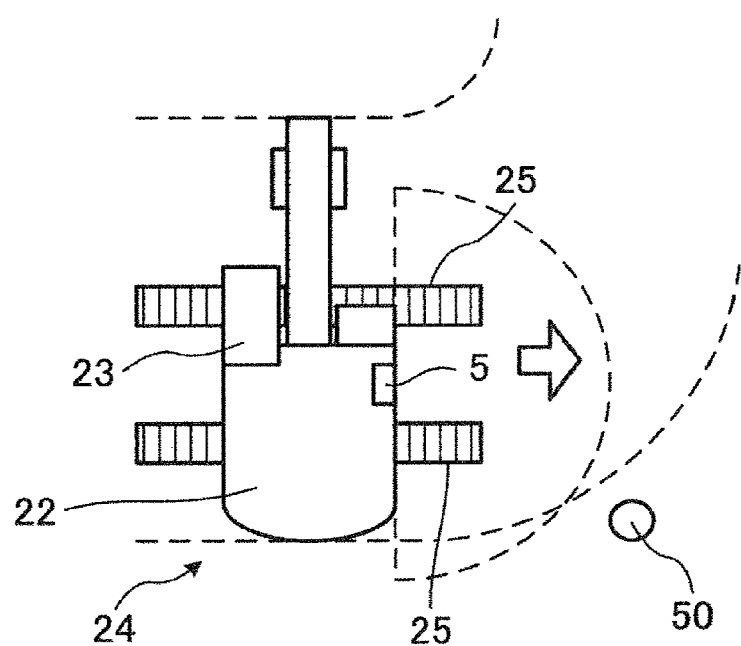
FIG. 5 is a top view of the working machine that travels in a curve in the first embodiment.
Figure 6:
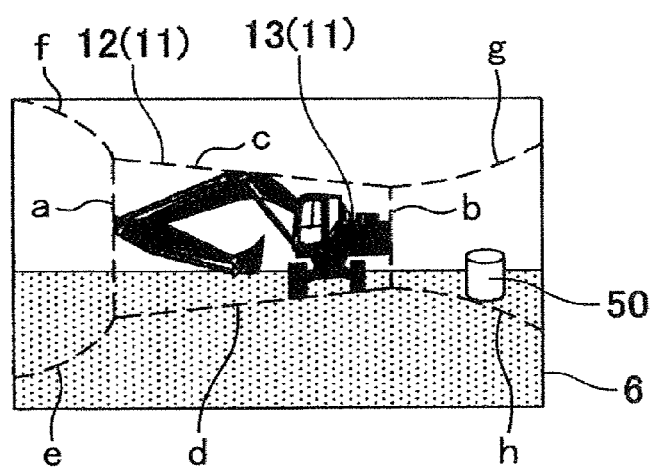
FIG. 6 is a diagram illustrating a display screen in the working machine traveling in a curve in the first embodiment.

FIG. 5 is a top view of the working machine 20. FIG. 6 is a diagram illustrating a screen displayed on the display 6 when the lower travelling body 21 travels in a curve as illustrated in FIG. 5. As illustrated in FIG. 6, the display control unit 72 causes the display 6 to display the range image 11 that is curved along a locus of curved travelling of the lower travelling body 21. Therefore, the operator who views the display 6 can judge whether the obstacle 50 is present within the expected passage range even if the lower travelling body 21 travels in a curve.

For example, the display control unit 72 calculates a radius and a slewing direction (for example, right front, right rear, or the like) of the locus of the curved travelling of the lower travelling body 21 based on a difference between the operation amount of the right travelling lever 2 and the operation amount of the left travelling lever 2. Then, the display control unit 72 may curve the range image 11 by curving the four lines e to h indicating the depth of the expected passage range in accordance with the calculated radius and the slewing direction of the locus, and by deforming the quadrangle surrounded by the four lines a to d into a trapezoidal shape. For example, the display control unit 72 has a table in which the radius and the traveling direction of the locus and the correction amounts of the eight lines a to h are associated with each other in advance. The display control unit 72 then specifies the correction amount of each of the eight lines a to h associated with the radius and the traveling direction of the locus with reference to this table, and may correct the eight lines a to h using the specified correction amounts.

Effects

As described above, in the periphery monitoring device 1 according to the present embodiment, the range image 11 indicating the expected passage range which is the range of the locus of the machine body 24 in the case where the lower travelling body 21 travels in the imaging direction of the camera 5 is superimposed on the image captured by the camera 5, and is displayed on the display 6. This enables the operator who views the display 6 to judge whether the obstacle 50 is present within the expected passage range when the image captured by the camera 5 includes the obstacle 50. Therefore, the operator can easily check the contact between the upper slewing body 22 and the obstacle 50 when the lower travelling body 21 travels.

Further, the range image 11 is superimposed and displayed on the display 6 on condition that the lower travelling body 21 travels and its direction is the imaging direction of the camera 5. Therefore, when the lower travelling body 21 does not travels or when the traveling direction of the lower travelling body 21 is not the imaging direction of the camera 5, the range image 11 is not superimposed and displayed on the display 6. In these cases, since the image captured by the camera 5 is not blocked by the range image 11, the image captured by the camera 5 can be easily viewed.

In addition, the range image 11 is superimposed and displayed on a position in the image, the position corresponding to a position separated from the machine body 24 by a predetermined distance in the imaging direction of the camera 5. Therefore, since the image captured by the camera 5 has an illusion of depth, the operator can easily check the contact between the upper slewing body 22 and the obstacle 50 when the lower travelling body 21 travels.

In addition, the line image 12, as the expected passage range, indicates a line indicating the width of the machine body 24, a line indicating the height of the machine body 24, and a line indicating the depth of the expected passage range is displayed on the display 6. As a result, the area of the range image 11 to be superimposed on the image captured by the camera 5 can be minimized. Therefore, the operator can easily judge whether the image captured by the camera 5 includes the obstacle 50.

Further, the expected passage range is displayed on the display 6 as the contour image 13 indicating the contour of the machine body 24. As a result, the operator can easily judge the contact between the upper slewing body 22 and the obstacle 50 when the lower travelling body 21 travels, based on a positional relationship between the contour image 13 and the obstacle 50. Further, the operator can objectively check the attitude of the machine body 24 based on the contour of the machine body 24 indicated by the contour image 13.

Further, when the lower travelling body 21 travels, the image captured by the camera 5 is displayed on the display 6 so as to become an image on which the traveling direction of the lower travelling body 21 is a line of sight. As a result, the image displayed on the display 6 becomes the image on which the traveling direction of the lower travelling body 21 is a line of sight even if the upper slewing body 22 slews in any way. Therefore, the operator who views the display 6 can intuitively judge whether the obstacle 50 is present in the traveling direction of the lower travelling body 21.

When lower travelling body 21 travels in a curve, the range image 11 that is curved along the locus of the curved travelling of the lower travelling body 21 is displayed on the display 6. Therefore, the operator who views the display 6 can judge whether the obstacle 50 is present within the expected passage range even if the lower travelling body 21 travels in a curve.

Second Embodiment

A periphery monitoring device according to a second embodiment will be described below with reference to the drawings. Note that the configuration common to the first embodiment and the effect obtained by the configuration will not be described, and points different from the first embodiment will mainly be described. Note that the members identical to those in the first embodiment are denoted by the reference numerals identical to those in the first embodiment.

[Configuration of Periphery Monitoring Device]

Figure 7:
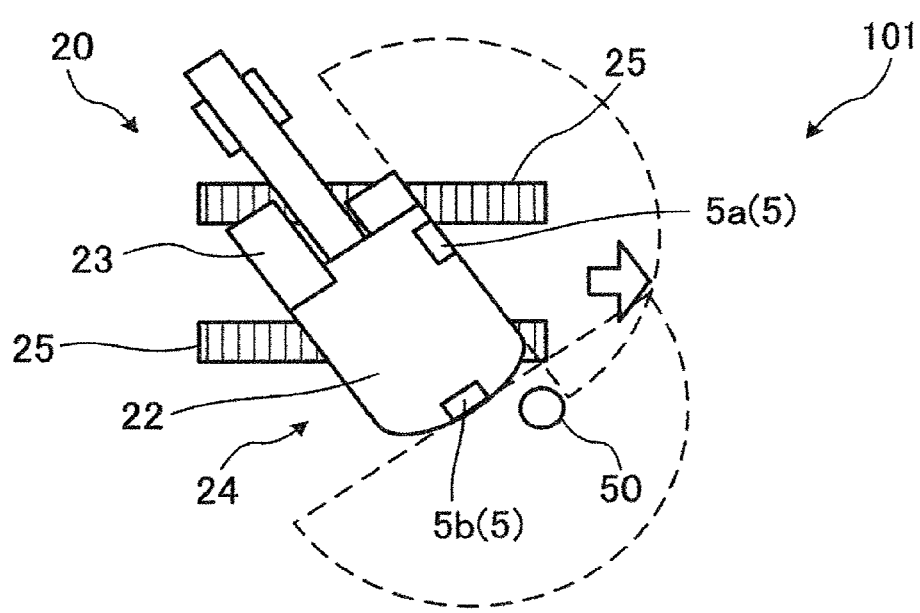
FIG. 7 is a top view of a working machine according to a second embodiment.

FIG. 7 is a top view of a working machine 20. As illustrated in FIG. 7, a periphery monitoring device 101 according to the second embodiment includes a plurality of cameras 5 having different imaging directions. In the present embodiment, the periphery monitoring device 101 includes a camera 5a that images a right side of an upper slewing body 22, the right side being a region that is a blind spot as viewed from a cab 23, and a camera 5b that images a rear side of the upper slewing body 22, the rear side being a region that is a blind spot as viewed from the cab 23. The camera 5b is disposed at the rear end of the upper slewing body 22.

Figure 8:
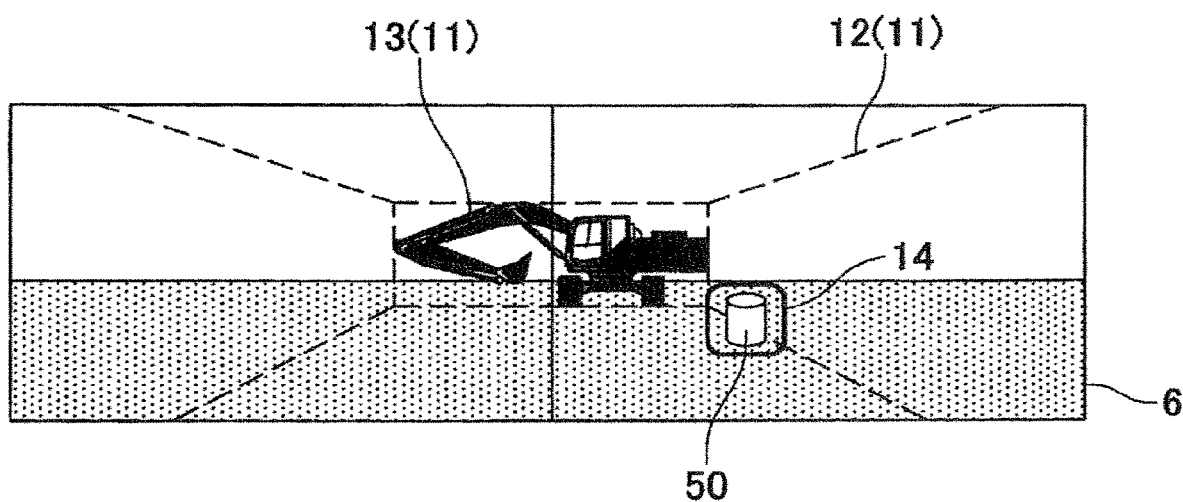
FIG. 8 is a diagram illustrating a display screen in in the second embodiment.

FIG. 8 is a diagram illustrating a screen displayed on a display 6. As illustrated in FIG. 8, a display control unit 72 splices the images captured by the plurality of cameras 5 to generate one image, and displays the generated one image on the display 6. The left half of FIG. 8 is the image captured by the camera 5a, and the right half of FIG. 8 is the image captured by the camera 5b. This enables the operator who views the display 6 to check the positional relationship between the rear end of the upper slewing body 22 and an obstacle 50 in a wide range.

When the images captured by the cameras 5 include the obstacle 50, an obstacle information calculation unit 74 calculates a position and a height of the obstacle 50. For example, the obstacle information calculation unit 74 detects an obstacle from images captured by the cameras 5 using an image recognition technology. The obstacle information calculation unit 74 calculates the position and the height of the detected obstacle 50 on the images. Next, the obstacle information calculation unit 74 calculates the position and height of the obstacle in a three-dimensional coordinate system of the working machine 20 based on the calculated position and height of the obstacle 50 on the images.

A determination unit 75 determines whether the obstacle 50 comes into contact with the upper slewing body 22 (including an attachment 30) based on the position and the height of the obstacle 50 calculated by the obstacle information calculation unit 74. For example, the determination unit 75 may determine that the obstacle 50 comes into contact with the upper slewing body 22 when the obstacle 50 is located within an expected passage range in the coordinate system and the height of the obstacle 50 in the coordinate system is greater than or equal to a threshold.

As illustrated in FIG. 8, the display control unit 72 causes the display 6 to highlight and display the obstacle 50 determined by the determination unit 75 as coming into contact with the upper slewing body 22. Specifically, the display control unit 72 causes the display 6 to superimpose and display a frame image 14 surrounding the obstacle 50 determined as coming into contact with the upper slewing body 22. This enables the operator who views the display 6 to intuitively check that the obstacle 50 that comes into contact with the upper slewing body 22 is present.

Effects

As described above, with the periphery monitoring device 101 according to the present embodiment, the obstacle 50 determined as coming into contact with the upper slewing body 22 is displayed on the display 6 in a highlighted manner. This enables the operator who views the display 6 to intuitively check that the obstacle 50 that comes into contact with the upper slewing body 22 is present.

In addition, the images captured by the cameras 5 are spliced and displayed on the display 6 as one image. This enables the operator who views the display 6 to check the positional relationship between the upper slewing body 22 and the obstacle 50 in a wider range.

Although the embodiments of the present invention have been described above, they are merely specific examples. The present invention is not particularly limited to the embodiments, and the specific configuration and the like can be modified in design as appropriate. Further, the actions and effects described in the embodiments of the present invention are merely the most suitable actions and effects resulting from the present invention, and the actions and effects of the present invention are not limited to those described in the embodiments of the present invention.

For example, in the above embodiments, a determination is made that the lower travelling body 21 travels when the operation amount of the travelling lever 2 is greater than or equal to the threshold, but the present invention is not limited thereto. The determination may be made whether the lower travelling body 21 travels, based on transition of the state between the operator and the travelling lever 2 from a non-interactive state to an interactive state. Here, the non-interaction state is, for example, a state in which the operator does not grip nor touch the travelling lever 2. Here, the interaction state is, for example, a state in which the operator grips or touches the travelling lever 2. Further, the determination may be made whether the lower travelling body 21 travels, based on whether the travelling lever 2 is operated in a dead zone by the operator.

In addition, when any value of the operation amount other than 0 of the travelling lever 2 is detected but the operation amount is less than the threshold, the determination may be made whether the lower travelling body 21 travels, based on whether the state of the operator and the travelling lever 2 has transitioned from the non-interaction state to the interaction state or whether the operator has operated the travelling lever 2 in the dead zone. In this manner, the range image 11 can be superimposed on the image captured by the camera 5 and displayed on the display 6 at an initial operation stage at which the lower travelling body 21 has not yet started to be operated while the operator is highly likely to have an intention to operate the lower travelling body 21. This enables the operator to easily judge the contact between the upper slewing body 22 and the obstacle 50.

Summary of the Embodiments

The embodiments are summarized as follows.

A periphery monitoring device according to the present embodiment is a periphery monitoring device for a working machine, the periphery monitoring device configured to monitor a periphery of the working machine having a machine body including a lower travelling body and an upper slewing body disposed in a slewable manner on an upper portion of the lower travelling body, the upper slewing body including a working device rotatable in a vertical direction with respect to a main body of the upper slewing body, and a cab. The periphery monitoring device includes a slewing angle detection device configured to detect a slewing angle of the upper slewing body with respect to the lower travelling body, an attitude detection device configured to detect an attitude of the working device, an imaging device configured to image a periphery of the upper slewing body, the imaging device being disposed at the upper slewing body, a display device disposed in the cab, a display control unit configured to cause the display device to display an image captured by the imaging device, and an expected passage range calculation unit configured to calculate a range of a locus of the machine body as an expected passage range in a case where the lower travelling body travels in an imaging direction of the imaging device, based on the slewing angle of the upper slewing body detected by the slewing angle detection device and the attitude of the working device detected by the attitude detection device. The display control unit superimposes a range image indicating the expected passage range calculated by the expected passage range calculation unit on an image captured by the imaging device to cause the display device to display a superimposed image.

According to this configuration, the range image indicating the expected passage range that is the range of the locus of the machine body in the case where the lower travelling body travels in the imaging direction of the imaging device is superimposed on the image captured by the imaging device to be displayed on the display device. This enables the operator who views the display device to judge whether an obstacle is present within the expected passage range when the image captured by the imaging device includes the obstacle. Therefore, the operator can easily judge the contact between the upper slewing body and the obstacle when the lower travelling body travels.

Preferably, the periphery monitoring device further includes a traveling direction detection device configured to detect a traveling direction of the lower travelling body, wherein the display control unit causes the display device to display the range image on condition that the lower travelling body travels and the traveling direction of the lower travelling body detected by the traveling direction detection device is the imaging direction of the imaging device.

According to this configuration, when the lower travelling body does not travel or when the traveling direction of the lower travelling body is not the imaging direction of the imaging device, the range image is not superimposed to be displayed on the display device. In these cases, since the image captured by the imaging device is not blocked by the range image, the image captured by the imaging device can be easily viewed.

Preferably, the periphery monitoring device further includes a traveling direction detection device configured to detect a traveling direction of the lower travelling body, and an image direction control unit configured to, when the lower travelling body travels, cause the display device to display the image captured by the imaging device with the image captured by the imaging device being an image on which the traveling direction of the lower travelling body detected by the traveling direction detection device is a line of sight.

According to this configuration, the image displayed on the display device becomes the image on which the traveling direction of the lower travelling body is a line of sight even if the upper slewing body slews in any way. Therefore, the operator who views the display device can intuitively judge whether an obstacle is present in the traveling direction of the lower travelling body.

In the periphery monitoring device, preferably, the display control unit superimposes and displays the range image on a position on the image, the position corresponding to a position separated from the machine body by a predetermined distance in the imaging direction of the imaging device.

According to this configuration, since the image captured by the imaging device has an illusion of depth, the operator can easily judge the contact between the upper slewing body and the obstacle when the lower travelling body travels.

In the periphery monitoring device, the range image includes a line image including a line indicating a width of the locus of the machine body, a line indicating a height of the locus of the machine body, and a line indicating a depth of the locus of the machine body.

This configuration can minimize the area of the range image to be superimposed on the image captured by the imaging device. Therefore, the operator can easily judge whether the image captured by the imaging device includes the obstacle.

In the periphery monitoring device, the range image preferably includes a contour age indicating a contour of the machine body.

This configuration enables the operator to easily judge the contact between the upper slewing body and the obstacle when the lower travelling body travels, based on a positional relationship between the contour image and the obstacle. Further, the operator can objectively judge the attitude of the machine body based on the contour of the machine body indicated by the contour image.

In the periphery monitoring device, when the lower travelling body travels in a curve, the display control unit bends the range image along a locus of a curved traveling of the lower travelling body.

This configuration enables the operator who views the display device to judge whether the obstacle is present within the expected passage range even if the lower travelling body travels in a curve.

Preferably, the periphery monitoring device further includes an obstacle information calculation unit configured to calculate a position and a height of the obstacle when the image captured by the imaging device includes the obstacle, and a determination unit configured to determine whether the obstacle comes into contact with the upper slewing body, based on the position and the height of the obstacle calculated by the obstacle information calculation unit, wherein the display control unit causes the display device to highlight and display the obstacle determined by the determination unit as coming into contact with the upper slewing body.

This configuration enables the operator who views the display device to intuitively judge that the obstacle that comes into contact with the upper slewing body is present.

In the periphery monitoring device, preferably, the imaging device includes a plurality of imaging units having different imaging directions, and the display control unit splices images captured by the imaging units to generate one image, and causes the display device to display the one image generated by the display control unit.

This configuration enables the operator who views the display device to understand the positional relationship between the upper slewing body and the obstacle in a wider range.

The invention claimed is:

1. A periphery monitoring device for a working machine, the periphery monitoring device configured to monitor a periphery of the working machine having a machine body including a lower travelling body and an upper slewing body disposed in a slewable manner on an upper portion of the lower travelling body, the upper slewing body including a working device rotatable in a vertical direction with respect to a main body of the upper slewing body, and a cab, the periphery monitoring device comprising:
   a slewing angle detection device configured to detect a slewing angle of the upper slewing body with respect to the lower travelling body;
   an attitude detection device configured to detect an attitude of the working device;
   an imaging device configured to image a periphery of the upper slewing body, the imaging device being disposed at the upper slewing body;
   a display device disposed in the cab;
   a display controller comprising a computer including circuitry, the circuitry configured to cause the display device to display an image captured by the imaging device; and
   an expected passage range calculator comprising the computer and circuitry, and the circuitry is configured to calculate a range of a locus of the machine body as an expected passage range in a case where the lower travelling body travels in an imaging direction of the imaging device, based on the slewing angle of the upper slewing body detected by the slewing angle detection device and the attitude of the working device detected by the attitude detection device,
   wherein the display controller superimposes a range image indicating the expected passage range calculated by the expected passage range calculator on the image captured by the imaging device to cause the display device to display a superimposed image,
   wherein the range image includes a contour image of the machine body when viewed from the imaging direction of the imaging device, a rectangle which surrounds the contour image, and four lines extending outward from four vortices of the rectangle and indicating a depth of the locus of the machine body,
   wherein the imaging direction is a travelling direction of the lower travelling body,
   wherein the rectangle includes a height line indicating a height of the machine body, and
   wherein the display controller lengthens the height line as the attitude becomes higher according to a change in the attitude of the working machine.

2. The periphery monitoring device for the working machine according to claim 1, wherein the circuitry is further configured to:
   detect a traveling direction of the lower travelling body,
   wherein the circuitry causes the display device to display the range image on condition that the lower travelling body travels and the traveling direction of the lower travelling body detected by the circuitry is the imaging direction of the imaging device.

3. The periphery monitoring device for the working machine according to claim 1, wherein the circuitry is further configured to:
   detect a traveling direction of the lower travelling body; and
   when the lower travelling body travels, cause the display device to display the image captured by the imaging device wherein the image captured by the imaging device being an image on which the traveling direction of the lower travelling body detected by the traveling direction detector is a line of sight.

4. The periphery monitoring device for the working machine according to claim 1, wherein the display controller superimposes and displays the range image on a position on the image, the position corresponding to a position separated from the machine body by a predetermined distance in the imaging direction of the imaging device.

5. The periphery monitoring device for the working machine according to claim 1, wherein the rectangle includes two lines indicating a width of the locus of the machine body and two lines indicating a height of the locus of the machine body.

6. The periphery monitoring device for the working machine according to claim 1, wherein the range image includes a contour image indicating a contour of the machine body.

7. The periphery monitoring device for the working machine according to claim 1, wherein when the lower travelling body travels in a curve, the display controller bends the range image along a locus of a curved traveling of the lower travelling body.

8. The periphery monitoring device for the working machine according to claim 1, wherein the circuitry is further configured to:

calculate a position and a height of an obstacle when the image captured by the imaging device includes the obstacle; and determine whether the obstacle comes into contact with the upper slewing body, based on the calculated position and height of the obstacle, wherein the circuitry causes the display device to highlight and display the obstacle determined by the determiner as coming into contact with the upper slewing body.

9. The periphery monitoring device for the working machine according to claim 1, wherein the imaging device includes a plurality of imaging devices having different imaging directions, and wherein the circuitry splices images captured by the imaging devices to generate one image, and causes the display device to display the one image generated by the display controller.

\* \* \* \* \*